(12) United States Patent
Iwao et al.

(10) Patent No.: US 11,384,918 B2
(45) Date of Patent: Jul. 12, 2022

(54) VEHICLE LAMP STRUCTURE

(71) Applicant: HONDA MOTOR CO., LTD., Tokyo (JP)

(72) Inventors: Shunsuke Iwao, Wako (JP); Daisuke Nakashima, Wako (JP); Hiroya Ohkubo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/325,451

(22) Filed: May 20, 2021

(65) Prior Publication Data

US 2021/0364146 A1 Nov. 25, 2021

(30) Foreign Application Priority Data

May 25, 2020 (JP) .............................. JP2020-090621

(51) Int. Cl.
| | |
|---|---|
| *F21S 43/40* | (2018.01) |
| *F21V 7/04* | (2006.01) |
| *F21S 43/20* | (2018.01) |
| *F21S 43/31* | (2018.01) |

(52) U.S. Cl.
CPC ............... *F21S 43/40* (2018.01); *F21S 43/26* (2018.01); *F21S 43/31* (2018.01); *F21V 7/048* (2013.01)

(58) Field of Classification Search
CPC ........ F21S 43/239; F21S 43/237; F21S 43/30; F21S 43/31; F21S 43/26
See application file for complete search history.

(56) References Cited

U.S. PATENT DOCUMENTS

| | | | |
|---|---|---|---|
| 10,876,703 B2* | 12/2020 | Sakashita | ............... G02B 6/002 |
| 10,988,094 B2* | 4/2021 | Walters | .................... B60Q 3/51 |
| 2021/0062993 A1* | 3/2021 | Buisson | ................ F21S 43/239 |

FOREIGN PATENT DOCUMENTS

JP          2013-235729 A       11/2013

* cited by examiner

*Primary Examiner* — Matthew J. Peerce
(74) *Attorney, Agent, or Firm* — Rankin, Hill & Clark LLP

(57) ABSTRACT

A vehicle lamp structure 1 comprises an inner lens 3 scattering light from a light source, and a reflector 4 that is disposed inward of the inner lens 3 in a vehicle inside-outside direction and reflects the light from the inner lens 3, the reflector 3 including a first face 4a that is disposed so as to intersect with the vehicle inside-outside direction and a second face 4b that is disposed so as to intersect with an up-down direction and connected with the first face 4a at a predetermined angle θx to the first face 4a.

7 Claims, 5 Drawing Sheets

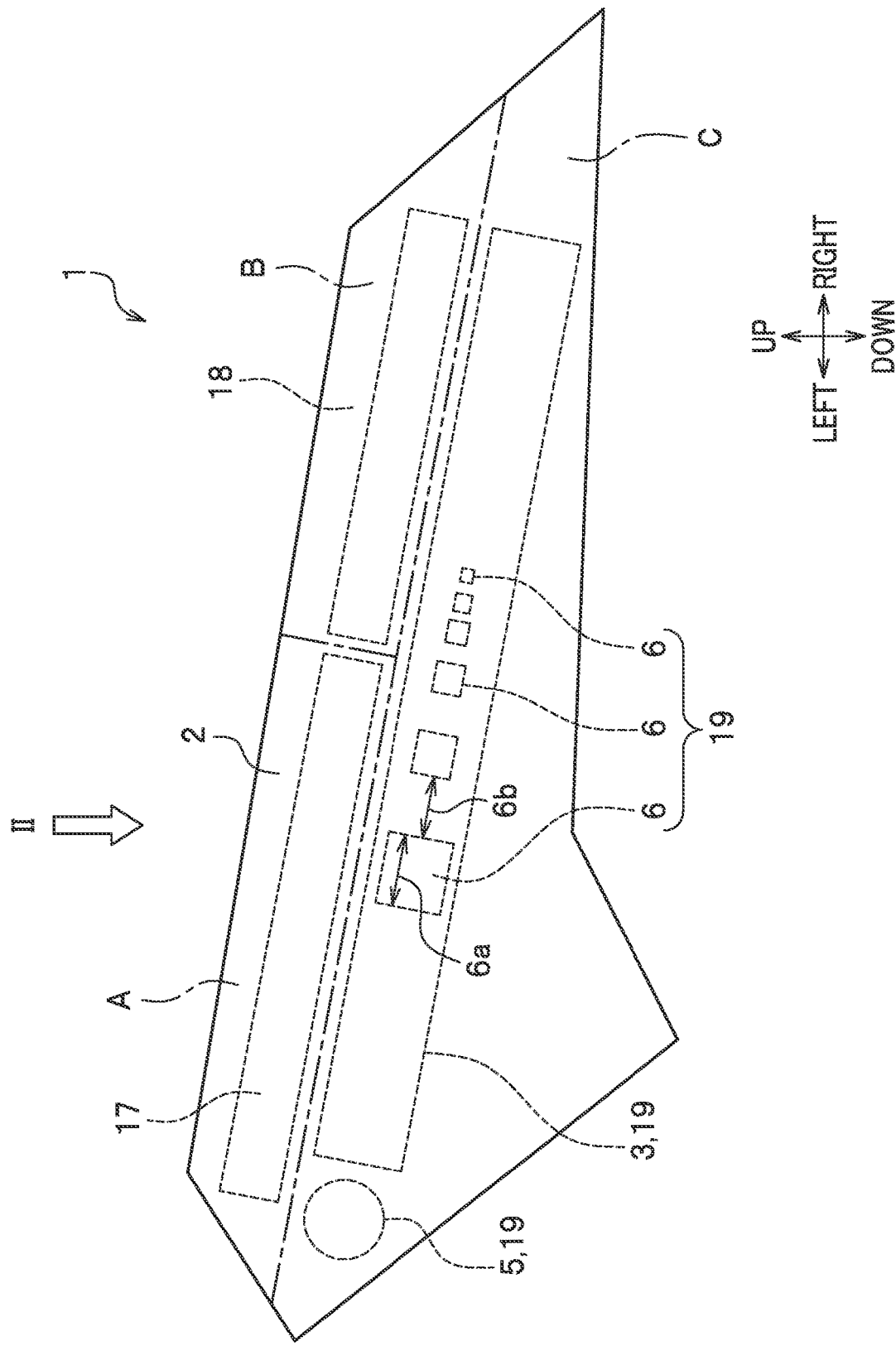

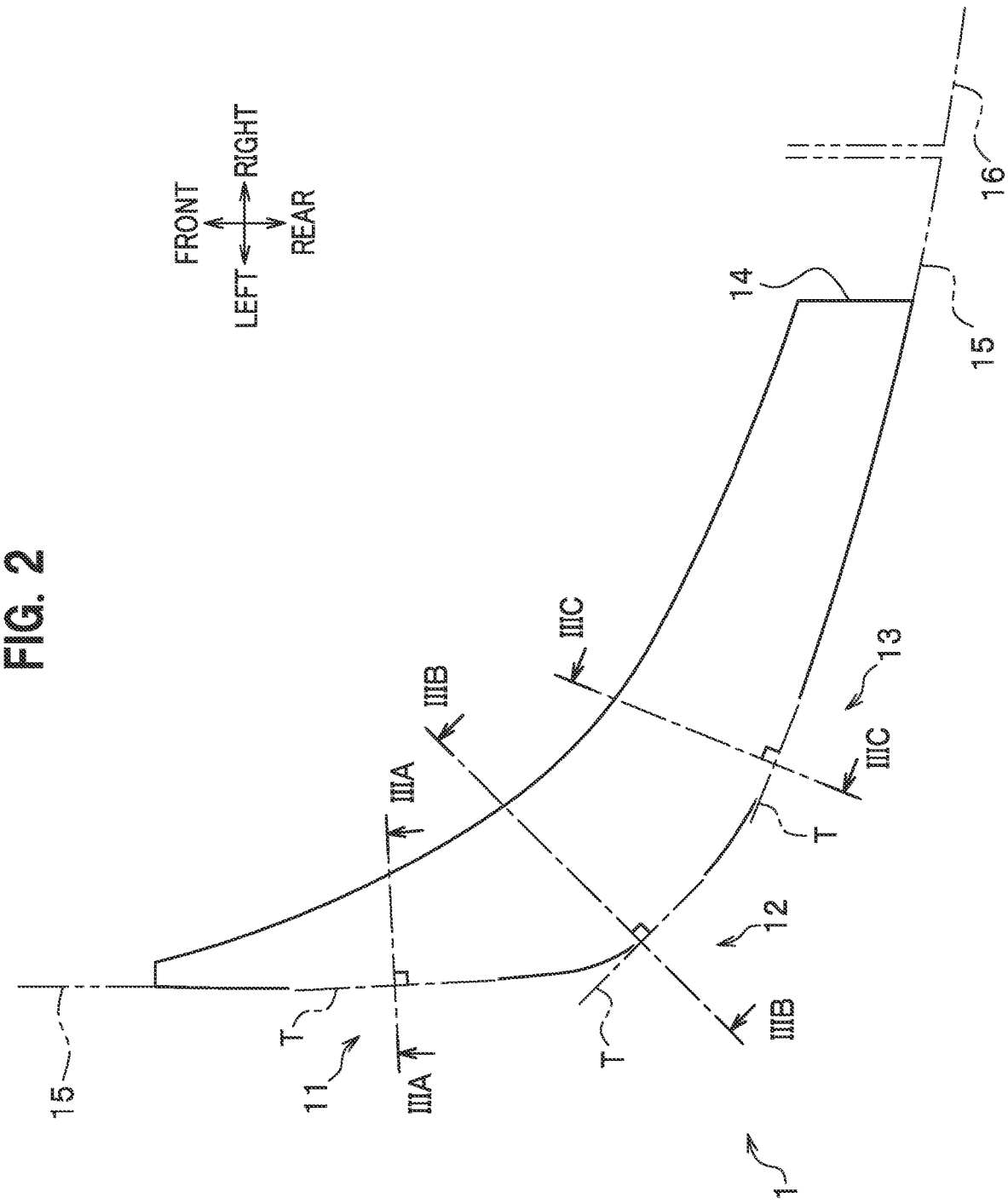

FIG. 3A
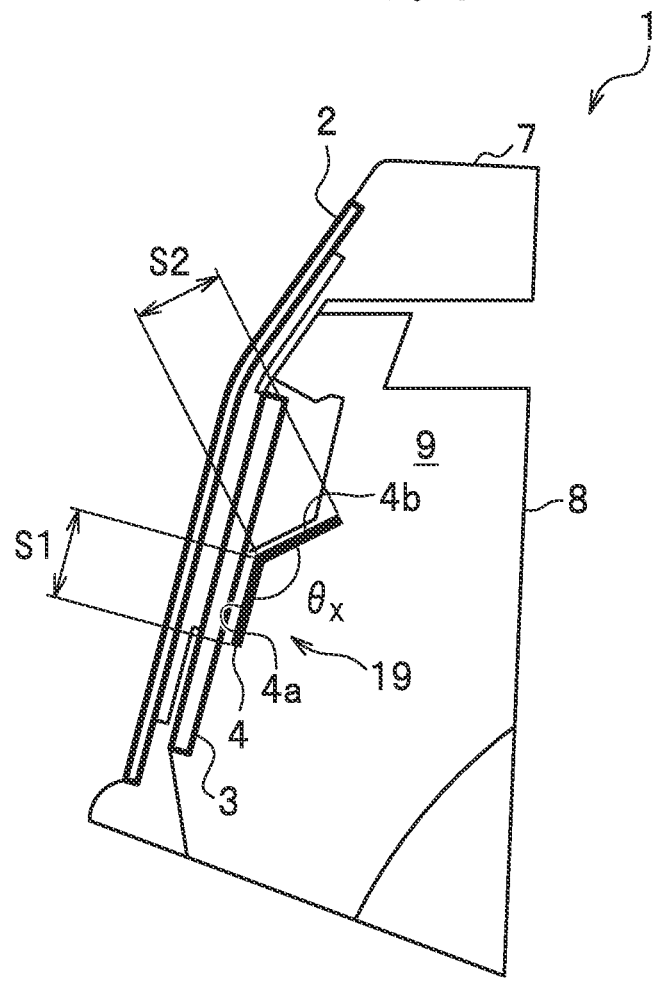
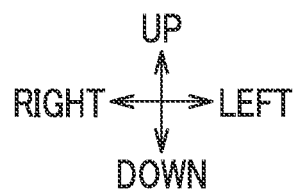

FIG. 3B
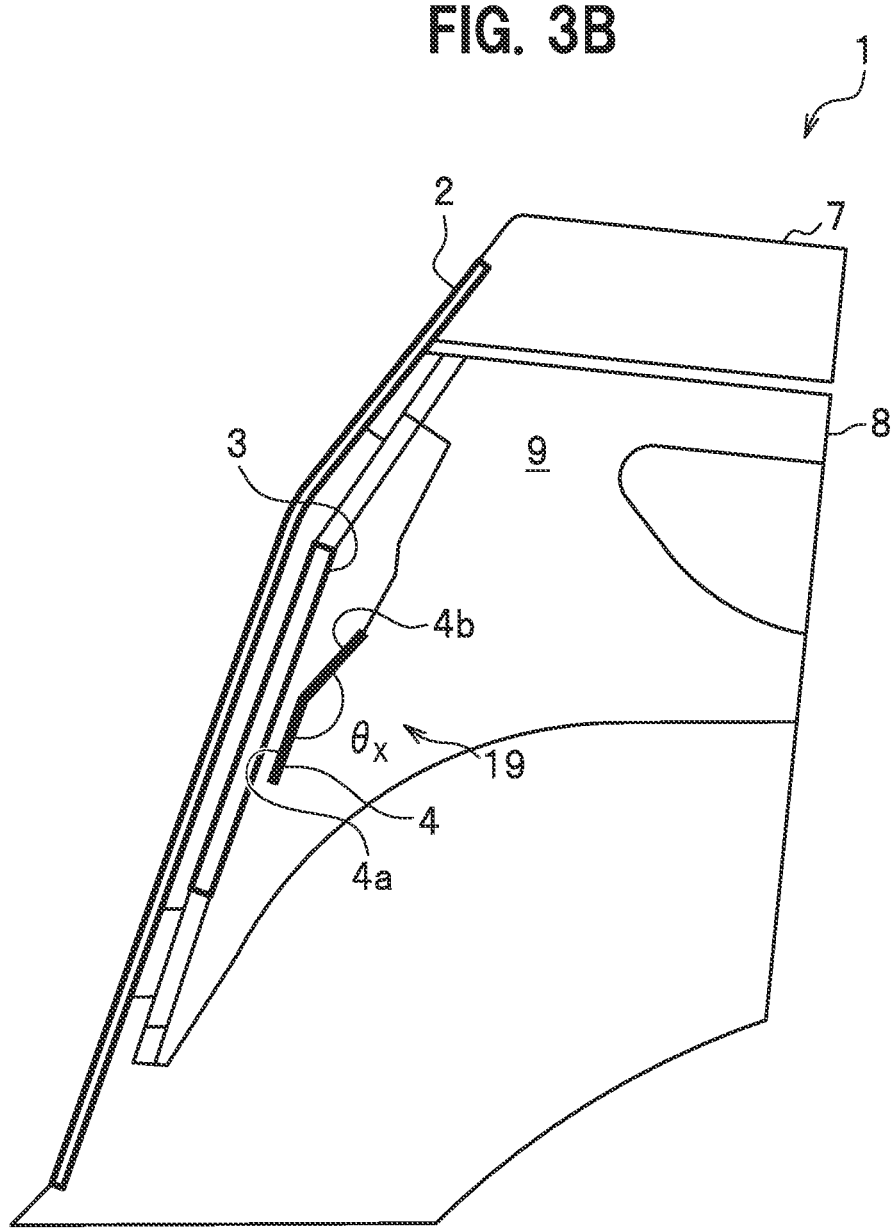
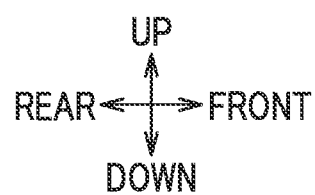

FIG. 3C
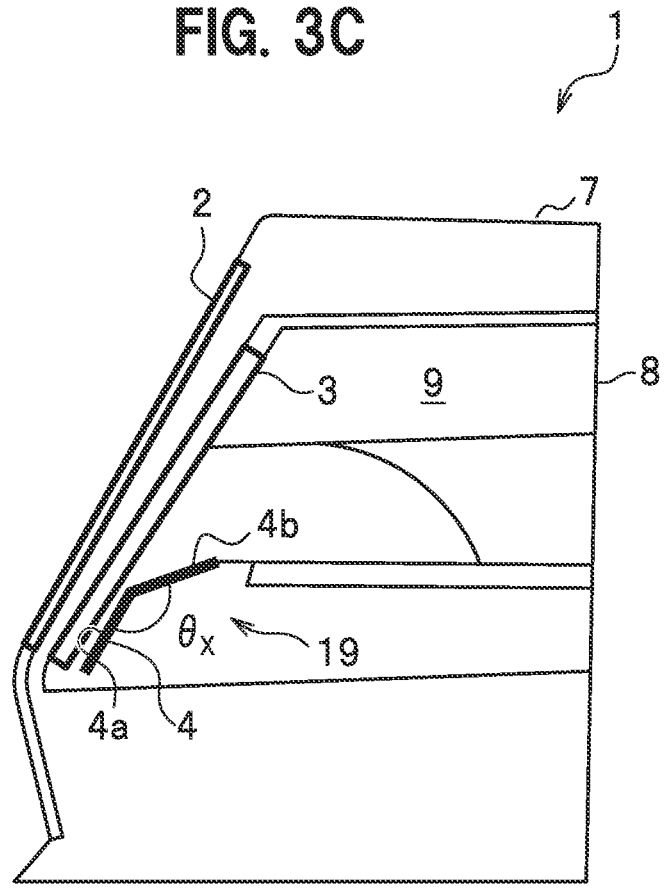
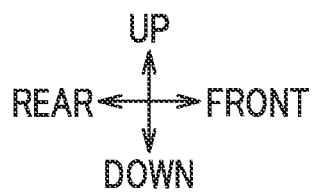

VEHICLE LAMP STRUCTURE

CROSS REFERENCE TO RELATED APPLICATIONS

This application claims the foreign priority benefit under 35 U.S.C. § 119 of Japanese Patent Application No. 2020-090621 filed on May 25, 2020, the disclosure of which is incorporated herein by reference.

TECHNICAL FIELD OF THE INVENTION

The present invention relates to a vehicle lamp structure.

BACKGROUND OF THE INVENTION

A conventional vehicle lamp structure for a position lamp installed on a front portion of a vehicle, which has been known to the public, comprises a light transmissible cover, a light directing plate including light scattering sections and a reflector including plural cylindrical mirrors. The light transmissible cover, the light directing plate and the reflector are arranged in this order from an outer face of a vehicle. For example, JP2013-235729A discloses this type of the vehicle lamp structure.
The position lamp of this type includes many punctate recessed portions formed over an outer face of the light directing plate that faces the light transmissible cover.

Each of these punctate recessed portions is a depressed portion in a reversed conical shape. These punctate recessed portions are arranged at constant intervals in each of the lateral and longitudinal directions of the outer face of the light directing plate. In the case of this position lamp, light is emitted from light sources arranged at a whole length of a side end of the light directing plate into an inside of the light directing plate. This light propagates in a face direction of the light directing plate inside the light directing plate and part of the light is reflected and scattered diffusely rearward by a diagonal conical face of each of the punctate recessed portions. Then, the rearward scattered light is reflected frontward by plural cylindrical mirrors (reflectors).

As a result, the position lamp has light emitted from light sources reflected on a whole face of the light directing plate and shows virtual images of the punctate recessed portions that are recognized at various depths being different between the plural cylindrical mirrors.

However, in the case of the conventional position lamp (for example, as shown in JP2013-235729A), a viewer can feel virtually a depth for the how the light from the position lamp is reflected, seeing plural virtual images of punctate recessed portions respectively reflected on each of a plurality of the cylindrical mirrors arranged laterally and feeling a sense of perspective derived from a difference in the depth position of the punctate recessed portions between the cylindrical mirrors. The viewer can not feel a depth of the lighting portion of the position lamp.

An objective of the present invention is to provide a vehicle lamp structure with which a viewer can feel as if the lighting portion of the vehicle lamp structure has a depth. portion.

A vehicle lamp structure of the invention to achieve the objective as described above comprises an inner lens scattering light from a light source, and a reflector that is disposed inward of the inner lens in a vehicle inside-outside direction and reflects the light from the inner lens, the reflector including a first face that is disposed so as to intersect with the vehicle inside-outside direction and a second face that is disposed so as to intersect with an up-down direction and connected with the first face at a predetermined angle to the first face.

The present invention enables providing a vehicle lamp structure with a sufficient effect of giving a viewer a sense that a lighting portion of the vehicle lamp structure has a depth.

BRIEF DESCRIPTION OF THE DRAWINGS

FIG. 1 shows schematically a rear elevation view of a vehicle lamp structure of an embodiment of the present invention installed at a rear portion of a vehicle illustrating a configuration of the vehicle lamp structure.

FIG. 2 is a plan view of the vehicle lamp structure viewed from II direction as indicated with an arrow mark in FIG. 1.

FIG. 3A is a cross-sectional view of the vehicle lamp structure along a line IIIA-IIIA shown in FIG. 2.

FIG. 3B is a cross-sectional view of the vehicle lamp structure along a line IIIB-IIIB shown in FIG. 2.

FIG. 3C is a cross-sectional view of the vehicle lamp structure along a line IIIC-IIIC shown in FIG. 2.

DETAILED DESCRIPTION OF THE INVENTION

Hereinafter, a vehicle lamp structure of an embodiment of the present invention is described in detail.

The vehicle lamp structure of the embodiment has a main aspect of the reflecting face of the reflector being formed by a first face disposed so as to intersect with a vehicle inside-outside direction and a second face that is connected to the first face so that the second face is kept inclined from the first face at a predetermined angle between the first face and the second face, intersecting with the up-down direction.

A pair of the vehicle lamp structures is attached respectively to left and right sides of a rear portion of a vehicle. Only a vehicle lamp structure attached to the left side of the rear portion of the vehicle is described as an example in the description below. A vehicle lamp structure attached to the right side of the rear portion of the vehicle is symmetrical to the vehicle lamp structure attached to the left side of the rear portion with respect to a center line of the vehicle and its description is skipped.

FIG. 1 shows a rear elevation view of a vehicle lamp structure 1 of the embodiment attached to the left side of the rear portion of the vehicle The front-rear direction, the up-down direction and the left-right direction in the description below respectively corresponds to the front-rear direction, the up-down direction, and the left-right direction of the vehicle to which the vehicle lamp structure 1 is attached.

As shown in FIG. 1, the vehicle lamp structure 1 of the embodiment is seen to having an outer shape substantially corresponding to an outer shape of an outer lens 2, when the vehicle is viewed from rearward of the vehicle.

When the vehicle is viewed from rearward of the vehicle, the vehicle lamp structure 1 is seen having an up-down direction width, which is larger on the outer side in the vehicle width direction (left side in FIG. 1), that is, on the left side of the vehicle body, and is smaller on inner side in the vehicle width direction (right side in FIG. 1).

FIG. 2 shows schematically a plan view of the vehicle lamp structure 1 viewed from II direction as indicated with an arrow mark in FIG. 1.

As shown in FIG. 2, the vehicle lamp structure 1 of the embodiment viewed from upward is disposed over a rear-left corner portion of the vehicle. To be specific, an outer shape of the vehicle lamp structure 1 has a side section 11 disposed on the left side of the vehicle and extending in the front-rear direction of the vehicle, an arc section 12 in a gentle arc shape extending from the side section 11, and a rear section 13 extending from the arc section 12.

In addition, the vehicle lamp structure 1 has an end section 14 at an inner end thereof in the vehicle width direction (left-right direction). This end section 14 is disposed outward of a movable part 16 in the vehicle width direction. The movable part 16 is attached to a rear portion of the vehicle according to a vehicle type and constituted by such a part as a rear door or a trunk lid. That is, the vehicle lamp structure 1 is disposed only on the vehicle body 15 and does not extend from the vehicle body 15 over to the movable part 16.

The vehicle lamp structure 1 of the embodiment is intended to be used for a rear combination lamp. To be specific, the vehicle lamp structure 1 includes a lighting region A of a turn signal lamp/hazard warning flashing lamp 17, a lighting region B of a back-up lamp 18, and a lighting region C of a brake lamp/tail lamp 19.

In FIG. 1, the lighting regions A, B, C are respectively partitioned with virtual lines (dashed-dotted lines). In addition, the light source 5, the inner lens 3, and the light scattering sections 6, which are disposed inward of the outer lens 2 in the vehicle inside-outside direction and form the turn signal lamp/hazard warning flashing lamp 17, the back-up lamp 18 and the brake lamp/tail lamp 19, are indicated with dotted lines in FIG. 1.

As is shown in the rear view of the vehicle lamp structure 1 in FIG. 1, the lighting regions A, B of the vehicle lamp structure 1 are aligned in the vehicle width direction and arranged adjacent to each other on the upper side of the vehicle lamp structure 1. To be specific, the turn signal lamp/emergency flashing light 17 is disposed on the outer side in the vehicle width direction (on the left side of FIG. 1) and the back-up lamp 18 is disposed on the inner side in the vehicle width direction (on the right side of FIG. 1). The turn signal lamp/hazard warning flashing lamp 17 and the back-up lamp 18 are arranged so as to be aligned along a line extending in the vehicle width direction.

The turn signal lamp/hazard warning flashing lamp 17 and the back-up lamp 18 correspond respectively to "turn signal lamp" and "back-up lamp" in the claims.

The lighting region C is formed over a region that is disposed under the lighting regions A, B and extends over a length of the vehicle lamp structure 1 in the vehicle width direction.

Next, the brake lamp/tail lamp 19 forming the lighting region C is described.

FIG. 3A shows a cross-sectional view of the vehicle lamp structure 1 along the IIIA-IIIA line in FIG. 2. FIG. 3B shows a cross-sectional view of the vehicle lamp structure 1 along the IIIB-IIIB line in FIG. 2. FIG. 3C shows a cross-sectional view of the vehicle lamp structure 1 along the IIIC-IIIC line in FIG. 2.

As seen in FIG. 2, each of the IIIA-IIIA cross section, the IIIB-IIIB cross section and the IIIA-IIIA cross section represents a cross section of the vehicle lamp structure 1 along the vehicle inside-outside direction.

To be specific, as seen from the plan view of the vehicle lamp structure 1 in FIG. 2, the IIIA-IIIA cross section is a cross section of the vehicle lamp structure 1 perpendicular to a tangent line T extending along an outer face of the side section 11 of the vehicle lamp structure 1, the IIIB-IIIB cross section is a cross section of the vehicle lamp structure 1 perpendicular to a tangent line T extending along an outer face of the arc section 12 of the vehicle lamp structure 1 and the IIIC-IIIC cross section is a cross section of the vehicle lamp structure 1 perpendicular to a tangent line T extending along an outer face of the rear section 13 of the vehicle lamp structure 1

As is shown in FIG. 3A to FIG. 3C, the vehicle lamp structure 1 includes a lamp housing 7 having an opening to the outside of the vehicle and an outer lens 2 disposed so as to close the opening of the lamp housing 7. The lamp housing 7 and the outer lens 2 form an outer lamp body 8.

A lamp chamber 9 is an inner space formed inside the outer lamp body 8.

As shown in FIG. 3A to FIG. 3C, the brake lamp/tail lamp 19 of the vehicle lamp structure 1 includes the outer lens 1, an inner lens 3 inclusive of a light source 5 (See FIG. 1) and light scattering sections 6 (See FIG. 1), and a reflector 4, which are disposed in this order from the outside to the inside of the vehicle.

The outer lens 2 is a cover member made of a light transmissible synthetic resin to cover an outer face of the inner lens 3.

An outer edge portion of the outer lens 2 is fixed to an outer edge portion of the lamp housing 7 forming the opening with a seal (not shown).

The outer lens 2 as described above extends over the side section 11 (See FIG. 2), the arc section 12 (See FIG. 2), and the rear section 13 (See FIG. 2) so as to form an outer face of the vehicle lamp structure 1 fitted on an outer side of a vehicle, which is in a gently curved shape.

The turn signal lamp/hazard warning flashing lamp 17 (See FIG. 1) and the back-up lamp 18 (See FIG. 1), which are disposed above the brake lamp/tail lamp 19 and in the lamp chamber 9, emit light through the outer lens 2 as well. However the turn signal lamp/hazard warning flashing lamp 17 and the backup lamp 18 are not shown and omitted in FIG. 3A to FIG. 3C.

As shown in FIG. 3A to FIG. 3C, the inner lens 3 is disposed inward of the outer lens 3 in the vehicle inside-outside direction. The inner lens 3 as described is made of a light transmissible synthetic resin.

As shown in FIG. 1, the inner lens 3 extends over the lighting region C and in the vehicle width direction of the vehicle lamp structure 1.

That is, the inner lens 3 is disposed inside of the vehicle, is in a gently curved shape, and extends from the side section 11 (See FIG. 2) over the arc section 12 (See FIG. 2) to the rear section 13 (See FIG. 2).

In addition, the inner lens 3 has an up-down direction width that is substantially constant from the side section 11 (See FIG. 2) over to the rear section 13 (See FIG. 2), as seen in FIG. 1 and FIG. 3A to FIG. 3C.

The inner lens 3 as described functions as a light directing plate to direct light emitted from a light source 5 (See FIG. 1). In other words, the light emitted from the light source 5 (See FIG. 1) comes incident into the inner lens 3 through an edge face of the inner lens 3 (a front-end face in the vehicle front-rear direction) in the side section 11 (See FIG. 2) and then is directed from the side section 11 (See FIG. 2) to the rear section 13 (See FIG. 2), repeatedly being reflected inside between inner faces of the inner lens 3.

The light source 5 (See FIG. 1) of the embodiment may consist of light-emitting diodes or organic light-emitting diodes, but it may be an incandescent lamp or an electric discharge lamp.

The light source 5 as shown in FIG. 1 is schematically shown and the number and sizes of lamps the light source 5 includes may differ from those actually used. The light source 5 of this embodiment may include plural light emitting devices that are disposed at the edge face of the inner lens 3 (See FIG. 2) in the side section 11 and aligned in the up-down direction.

In addition, the inner lens 3 (See FIG. 1) may include plural light scattering sections 6 (See FIG. 1). The light scattering sections 6 are formed on at least one of a face on the inner side of the inner lens 3 in the vehicle inside-outside direction and a face on the outer side of the inner lens 3 in the vehicle inside-outside direction.

The light scattering sections 6 of the embodiment scatter part of light from the light source 5 (See FIG. 1) that is being directed by the inner lens 3 from the side section 11 (See FIG. 2) to the rear section 13 (See FIG. 2).

In addition, the scattering sections 6 (See FIG. 1) scatter the light from the light source 5 (See FIG. 1) so that the inner lens 3 is seen as if the inner lens 3 surface is lighting when a viewer looks at the inner lens 3 through the outer lens 2 (See FIG. 1). In addition, the light scattering sections 6 (See FIG. 1) scatter the light from the light source 5 (See FIG. 1) toward a reflector 4 (See FIG. 3A to FIG. 3C).

The light scattering sections 6 (See FIG. 1) as described above can be formed by performing emboss processing or streak processing on a surface section of the inner lens 3 having a predetermined area. However, the light scattering sections 6 may be formed by any other processing method as long as the resultant light scattering sections can scatter the light from the light source 5. For instance, each of the light scattering sections 6 (See FIG. 1) of this embodiment may be a plane section that is more or less in a square shape and on which emboss processing or streak processing is performed. However, the shape of the plane section of the light scattering section 6 (See FIG. 1) is not limited to the square shape and may be any of various shapes such as a circular shape, an elliptical shape, a polygonal shape other than a square shape, or an indefinite shape.

As shown in FIG. 1, the light scattering sections 6 of this embodiment may be formed so as to be aligned in a longitudinal direction of the inner lens 3 (See FIG. 2) from the outer side toward the inner side in the vehicle width direction (from the side section 11 toward the rear section 13). In addition, the light scattering sections 6 are formed in such a manner that the nearer the light scattering section 6 is to the center of the vehicle in the vehicle width direction (to the right side in FIG. 1), the larger a lateral width 6a of the light scattering section 6 becomes.

Furthermore, the light scattering sections 6 are formed in such a manner that the nearer a gap 6b between a couple of the light scattering sections 6 located next to each other is to the center of the vehicle in the vehicle width direction, the smaller the gap 6b becomes.

Next, the reflector 4 (See FIG. 3A to FIG. 3C) of the vehicle lamp structure 1 of the embodiment is explained.

The reflector 4 functions to reflect the scattered light from the light scattering sections 6 (See FIG. 1) formed in the inner lens 3 toward the inner lens 3.

The reflector 4 of this embodiment is disposed inward of the inner lens 3 in the vehicle inside-outside direction as shown in FIG. 3A to FIG. 3C, is in a gently curved shape, and extends from the side section 11 (See FIG. 2) across the arc section 12 (See FIG. 2) to the rear section 13 (See FIG. 2).

Looking at the cross section of the vehicle lamp structure 1 along the vehicle inside-outside direction as seen in FIG. 3A to FIG. 3C, the reflector 4 has a reflecting face consisting of a first face 4a that intersects with the vehicle inside-outside direction and a second face 4b that is connected with the first face 4a so that the second face 4b is kept inclined from the first face 4a at a predetermined angle θx between the first face 4a and the second face 4b, intersecting with the up-down direction.

To be more specific, the reflector 4 as described above has the first face 4a extending in the up-down direction along the inner lens 3 and the second face 4b extending upward from an upper edge of the first face 4a gradually becoming further apart from the inner lens 3, in other words extending upward and gradually inward in the vehicle inside-outside direction.

The first face 4a of this embodiment is assumed to extend in parallel with the inner lens 3. However, if each of the first face 4a and the second face 4b is disposed opposite the inner lens 3, the first face 4a does not necessarily need to extend in parallel with the inner lens 3, which is described later.

The predetermined angle θx as indicated in FIG. 3A to FIG. 3C is an angle on the narrow-angle side made between the first face 4a and the second face 4b, and the angle made between the first face 4a as a reflecting face and the second face 4b as a reflecting face is 2Π−θx (radian) that is an angle on the wide-angle side. The angle θx is assumed to be larger than Π/2 (radian). However, the angle θx is not necessarily limited to an angle value larger than Π/2 (radian), if each of the first face 4a and the second face 4b is disposed opposite the inner lens 3.

The predetermined angle θx is a variable parameter in the present embodiment.

To be specific, in the side section 11 and the rear section 13 where the reflector extends linearly as shown in FIG. 2, the second face 4b (See FIG. 3A and FIG. 3C) is connected with the first face 4a (See FIG. 3A and FIG. 3C) at a constant angle θx (See FIG. 3A and FIG. 3C) to the first face 4a. On the other hand, in the arc section 12 where the reflector 4 is in a curved shape as shown in FIG. 2, the angle θx between the first face 4a and the second face 4b (See FIG. 3B) is larger than the angle θx in the side section 11 and the rear section 13 (See FIG. 3A and FIG. 3C). The angle θx (See FIG. 3A) in the side section 11 (See FIG. 2) is set more or less equal to the angle θx (See FIG. 3C) in the rear section 13 (See FIG. 2).

The predetermined angle θx may be set in such a manner that the angle θx is the largest at a portion of the reflector 4 in the arc section 12 as shown in FIG. 2 and gradually decreases from the portion of the reflector 4 toward ends of the reflector 4 in the side section 11 and the rear section 13 (See FIG. 3A and FIG. 3C).

An up-down direction length S1 of the first face 4a (See FIG. 3A) may be set more or less equal to a vehicle inside-outside direction length S2 (See FIG. 3A) over a whole length of the reflector 4 of the present embodiment (See FIG. 3A to FIG. 3C) from the side section 11 to the rear section 13, as shown in FIG. 2.

In addition, the reflector 4 (See FIG. 3A to FIG. 3C) may have the second face 4b whose reflection rate is set higher than that of the first face 4a. There are known methods to make the reflection rate of the second face 4b higher than that of the first face 4a, and any of them may be used. For instance, a method to change surface smoothness of the reflecting faces of the reflector 4 or a method to apply a high reflection film (High Reflection Coating) on the second face 4b may be used.

Next, actions and effects of the vehicle lamp structure of the present embodiment are explained.

In the case of the conventional position lamp (See, for example, JP2013-235729A), a viewer can feel a depth for how the light from the position lamp is reflected on a reflector that is derived from a sense of perspective brought about by the plural virtual images seen on the reflector. However, the viewer cannot feel a depth of the lighting portion of the position lamp. On the other hand, the reflector 4 of the vehicle lamp structure 1 of the present embodiment includes a first face 4*a* disposed so as to intersect with the vehicle inside-outside direction and the second face 4*b* that is connected with the first face 4*a* so that the second face 4*b* is kept inclined from the first face 4*a* at a predetermined angle between the first face 4*a* and the second face 4*b*, intersecting with the up-down direction.

According to the vehicle lamp structure 1 as described above, there is a difference in the way in which the lighting portion of the position lamp is seen between the reflected light by the first face 4*a* and the reflected light by the second face 4*b*. As a result, a viewer can feel as if there is a depth of a portion of the position lamp that is lighting.

In addition, the reflector 4 of the vehicle lamp structure 1 of the present embodiment has the second face 4*b* whose reflection rate is higher than the first face 4*a*.

The vehicle lamp structure 1 of the present embodiment enables giving a viewer a sense that the lighting portion of the vehicle lamp structure 1 has a depth. As a result, the vehicle lamp structure 1 of the present embodiment can effectively give a viewer a sense of perspective derived from the way in which the lighting portion being seen through the outer lens 2.

For the vehicle lamp structure 1 of the present embodiment, the up-down direction length S1 of the first face 4*a* may be set approximately equal to the vehicle inside-outside-direction length S2 of the second face 4*b*.

The vehicle lamp structure 1 as described enables giving a viewer a sense that the lighting portion of the position lamp has a depth regardless of a position of an eye line of the viewer.

In addition, the vehicle lamp structure 1 of the present embodiment includes plural light scattering sections 6 of various sizes which are formed in the inner lens 3 and aligned along a line in the vehicle width direction in such a way that the nearer the light scattering section 6 is located to the center of the vehicle body in the vehicle width direction, the smaller the light scattering section 6 is.

The vehicle lamp structure 1 as described above enables a viewer to immediately recognize the inner lens 3 becoming smaller and narrower toward the center of the vehicle body in the vehicle width direction. As a result, a design of the vehicle lamp structure 1 is improved and the brake lamp/tail lamp 19 is more easily recognized.

In addition, the plural light scattering sections 6 are disposed in the inner lens 3 of the vehicle lamp structure 1 in such a way that the nearer a gap 6*b* between a couple of the light scattering sections 6 located next to each other is to the center of the vehicle in the vehicle width direction, the smaller the gap 6*b* becomes.

The vehicle lamp structure 1 as described above enables a viewer to immediately recognize the inner lens 3 becoming smaller and narrower toward the center of the vehicle body in the vehicle width. As a result, a design of the vehicle lamp structure 1 is improved and the brake lamp/tail lamp 19 is more easily recognized.

In addition, a whole structure of the vehicle lamp structure 1 of the present embodiment is fitted on the vehicle body side. In other words, the vehicle lamp structure 1 is disposed only on the vehicle body 15 and does not extend from the vehicle body 15 over to the movable part 16.

The vehicle lamp structure 1 as described above does not need additional edge portions that are needed if the vehicle lamp structure 1 is divided into a couple of pieces attached respectively to the vehicle body 15 and the movable part 16.

Furthermore, for the vehicle lamp structure 1 as described above, all wires connected to the vehicle lamp structure 1 are kept in a bundle on the vehicle body side, which contributes to reducing the production cost.

In addition, the vehicle lamp structure 1 of the present embodiment has the turn signal lamp/hazard warning flashing lamp 17 and the back-up lamp 18 aligned along a line in the vehicle width direction.

The vehicle lamp structure 1 as described above enables improving the design of its exterior appearance, which contributes to the turn signal lamp/hazard warning flashing lamp 17 and the back-up lamp 18 being more easily recognized.

It should be noted that the present invention can be applied not only to the embodiment as has been described, but also to various other embodiments.

The vehicle lamp structure 1 of the present embodiment is assumed to be applied to, so called, a rear combination lamp. However the present invention should not be limited to this and can be applied to a front combination lamp or other lamp devices.

What is claimed is:

1. A vehicle lamp structure mounted on an outer side of a vehicle, the vehicle lamp structure comprising:
    an inner lens that scatters light from a light source, the inner lens including a linear section extending substantially linearly when viewed in an up-down direction of the vehicle and an arc section having a curved shape when viewed in the up-down direction; and
    a reflector that is disposed opposite the inner lens and inward of the inner lens relative to the vehicle and reflects the light from the inner lens,
    wherein
    the reflector includes a first face that is disposed to extend along the inner lens and a second face that is connected with the first face and extends obliquely from the first face in a direction away from the inner lens, and
    an angle between the first face and the second face is larger in a portion of the reflector opposed to the arc section of the inner lens than in a portion of the reflector opposed to the linear section of the inner lens.

2. The vehicle lamp structure as claimed in claim 1, wherein the second face has a higher reflection rate than the first face does.

3. The vehicle lamp structure as claimed in claim 1, wherein a length of the first face in the up-down direction is substantially equal to a width of the second face in a left-right direction of the vehicle.

4. The vehicle lamp structure as claimed in claim 1, wherein plural light scattering sections are formed in the inner lens in such a way that the nearer each of the plural light scattering sections is located to a center of the vehicle in a left-right direction of the vehicle, the smaller a width of the light scattering section in the left-right direction becomes.

5. The vehicle lamp structure as claimed in claim 1, wherein plural light scattering sections are formed in the inner lens in such a way that the nearer a couple of the light scattering sections that are disposed next to each other are located to a center of the vehicle in a left-right direction of the vehicle, the smaller a gap between the couple of the light scattering sections is.

6. The vehicle lamp structure as claimed in claim 1, wherein a whole structure of the vehicle lamp structure is disposed on a vehicle body side.

7. The vehicle lamp structure as claimed in claim 1, wherein a turn signal lamp and a brake lamp are aligned along a line.

\* \* \* \* \*